Oct. 19, 1926.  
G. F. CRASS  
CAR BRAKE  
Filed Jan. 24, 1924  
1,604,024  
2 Sheets-Sheet 2
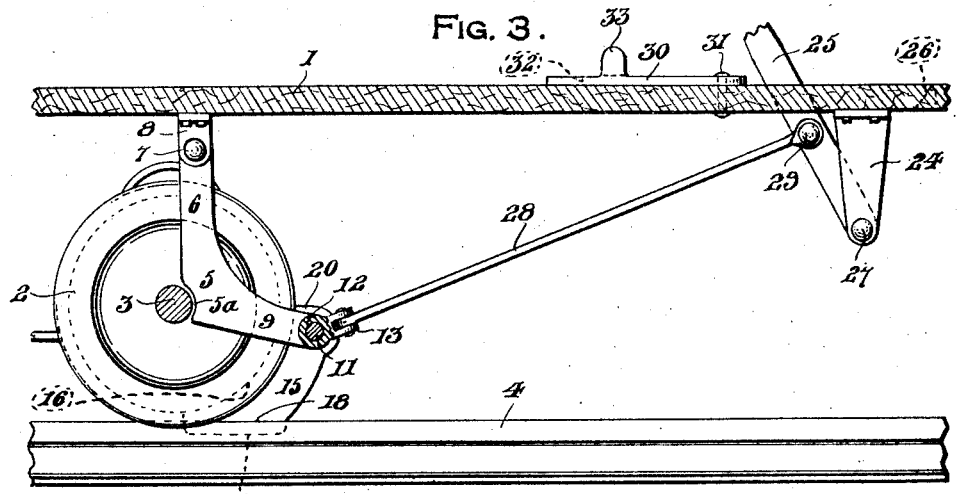
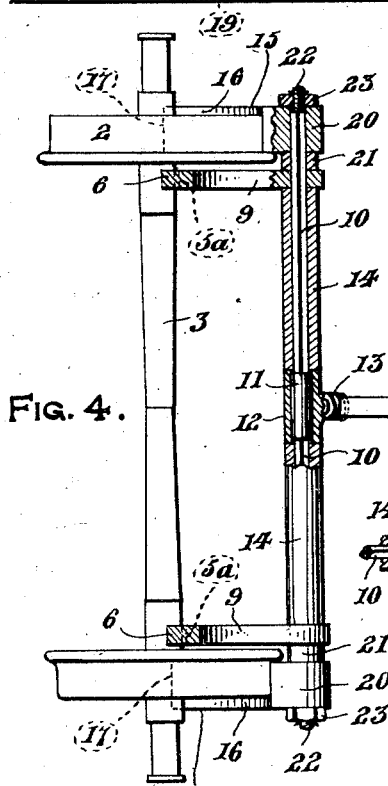
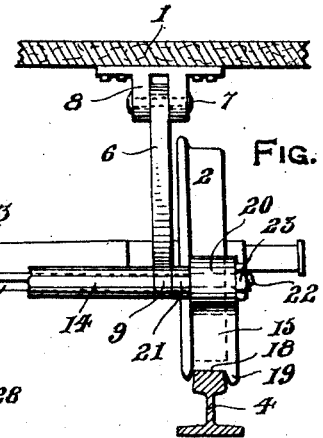
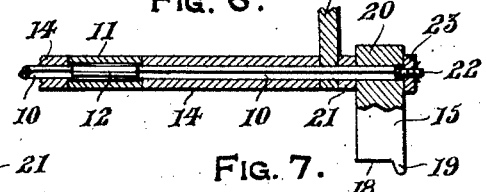
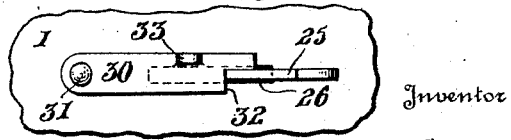
Inventor  
George F. Crass Patented Oct. 19, 1926.

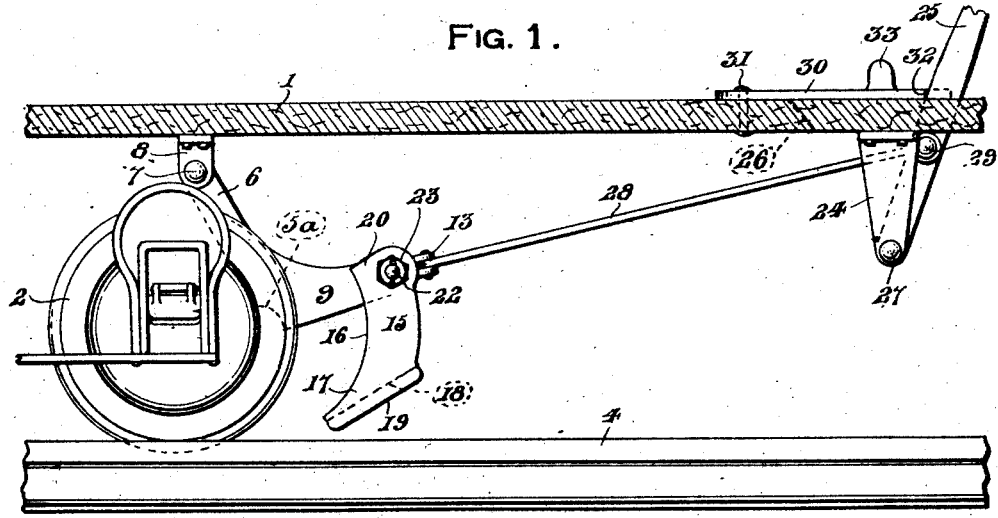
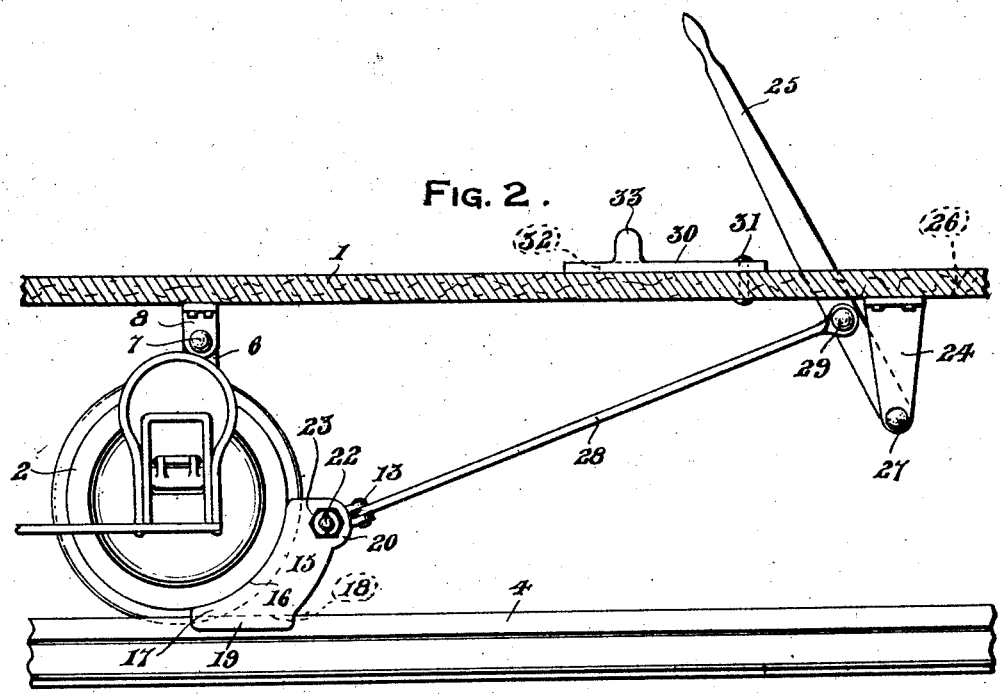

1,604,024

UNITED STATES PATENT OFFICE.

GEORGE F. CRASS, OF ITHACA, NEW YORK, ASSIGNOR OF ONE-HALF TO JOHN H. McCORMICK, OF ITHACA, NEW YORK.

CAR BRAKE.

Application filed January 24, 1924. Serial No. 688,213.

This invention relates to certain new and useful improvements in car brakes and particularly to the type wherein chock blocks or brake shoes are employed to be interposed between the wheels of the rolling stock and track rails for braking the car and arresting movement thereof.

One of the objects of the invention is to provide brake shoes that are normally held in an elevated position forwardly of the track wheels of a car and being manually controlled for automatic shifting to an operative position resting upon the track rails and so disposed as to cause the car wheels to mount the same to a limited degree for purposes of braking the car.

The invention further embodies in a car brake of the type above set forth the provision of hinged members supported beneath the bottom of the car for carrying the brake shoes with the hinged brake shoe supporting members constructed in a manner for cooperation with the adjacent axle of the car wheels to limit mounting or riding movement of the car wheels upon the brake shoes.

With the above and other objects in view as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a side elevational view of the car brake mechanism in its elevated inoperative position illustrated as supported upon the floor of a car that is shown in section, Figure 2 is a side elevational view, similar to Fig. 1 showing the car brake mechanism lowered to its operative position.

Figure 3 is a vertical longitudinal sectional view of the car brake mechanism showing one of the hinged arms supporting the brake shoes constructed for cooperation with the axle of the car wheel to limit riding movement of the car wheels upon the brake shoes, Figure 4 is a fragmentary top plan view, partly shown in section of the car brake mechanism, Figure 5 is a fragmentary end elevational view of the same, Figure 6 is a fragmentary longitudinal sectional view of the cross arms supporting the brake shoes, and Figure 7 is a fragmentary top plan view of a portion of a car floor showing the controlling lever for the brake shoes passing upwardly through an opening in the floor and the latch plate associated with the controlling lever for holding the brake shoes in an elevated inoperative position.

Referring more in detail to the accompanying drawing, there is illustrated a car brake mechanism constructed in a manner for positively braking the wheels of a car to arrest movement thereof, the braking mechanism being supported upon the floor 1 of a car that is mounted upon the wheels 2 of the axle 3 with the wheels running over the rails 4.

The supporting means for the brake shoes includes a pair of angle arms 5, one arranged adjacent each end of the axle 3 inwardly of the wheels 2 and supported upon the lower face of the car floor 1, the angle arms 5, each embodying a section 6 that is pivotally supported as at 7 upon a hanger 8 secured to the underside of the floor 1, while the other section 9 of the angle arm 5 extends at an obtuse angle to the section 6 that is slightly greater than a right angle as shown in side elevation in Fig. 3.

A cross rod 10, rectangular in cross-section receives the forward free ends of the arm sections 9 that are keyed thereon, the rod 10 being supported by the angle iron. The rectangular rod 10 at its median portion is of cylindrical formation as at 11 and a sleeve 12 rotatable on the cylindrical portion 11 and carrying outwardly projecting lugs 13 is provided for a purpose presently to appear. A sleeve 14 incloses a cross rod 10 at each side of the sleeve 12 and inwardly of the arm section 9 to properly position the sleeve with respect to the cylindrical portion of said rod.

A brake shoe is rigidly mounted upon each end of the cross rod 10 directly above the rail 4 and alined with the adjacent wheel 2, the brake shoe being of the general configuration illustrated in side elevation in Figs. 1 and 2 and embodying a body portion 15 having a continuously curved forward face 16 and a lower rearwardly tapering foot 17, a lower flat face 18 and a depending side flange 19, the flat face 18 being adapted for flatly engaging the tread of the rail 4 while the depending flange 19 is positioned parallel with the rail tread and outwardly thereof when operatively positioned as shown in Fig. 2. The upper end 20 of the brake shoe has a transverse rectangular bore that receives the adjacent end of the cross rod 10 and is moved into engagement with the spacing collar 21 positioned outwardly of the outer end of the arm section 9, the terminal ends of the cross rod 10 being threaded as at 22 for the reception of jamb nuts 23 that are suitably retained thereon outwardly of the brake shoe as illustrated.

The operating means for the brake shoes 15 includes a hanger 24 depending from the lower side of the car floor 1 forwardly of the hangers 8 and an operating lever 25 extending upwardly through a longitudinally extending slotted opening 26 provided in the car floor 1 with the lower end thereof pivotally mounted as at 27 in the lower end of the hanger 24. A link 28 is pivotally connected as at 29 at one of its ends to the operating lever 25 at a point beneath the car floor 1 while the other end of the brake rod 28 is pivotally connected to the outwardly projecting lugs 13 carried by the sleeve 12 as shown in Figs. 3 and 4. To retain the brake shoes in their elevated inoperative positions as illustrated in Fig. 1, there is provided a latch plate 30 flatly resting upon the upper side of the car floor 1 and pivotally mounted thereon as at 31, the forward end of the latch plate 30 at one side thereof being cut away to provide a recess 32 that receives the operating lever 25 when the same is shifted forwardly as shown in Figs. 1 and 7, the latch plate 30 being provided with an upstanding lug 33 to facilitate operation thereof by the foot of a person in control of the car.

With the brake shoes in their elevated inoperative positions as shown in Fig. 1, and it being desired to lower the same to operative positions for braking the wheels 2, the latch plate 30 is shifted upon its pivotal mounting 31 to disengage the same from the operating lever 27 and the weight of the brake shoes and associated mechanism will cause the same to fall upon the track rails 4 to a position between the rails and wheels 2, and during this movement, the angle arms 5 are lowered to the position illustrated in Fig. 3. The track wheels 2 mount the curved faces 15 of the brake shoes to a slight degree and to limit such movement, and to prevent the wheels from riding over the brake shoes, the outer angle of the angle arms 5 are curved inwardly as at 5ª and positioned for contact with the axle 3 which is obvious from an inspection of Fig. 3. The sleeve 12 connected to the link 28 and operating lever 25, being rotatable on the cylindrical portion 11 of the cross rod 10 permits lowering movement of the cross rod and the angle arms supporting the same. One advantage of providing a rigid link connection 28 between the operating lever 25 and cross-rod 10 is to permit the forceful positioning of the brake shoes between the car wheels and rails when the rails are covered with ice or snow to insure proper operation of the brake mechanism. The latch plate 30 may be shifted by engaging the lug 33 for freeing the operating lever 25 and permitting the brake shoes to move into engagement with the rails, and when the brake shoes are elevated to inoperative positions, the same are rigidly supported by the latch plate engaging the lever.

While there is herein shown and described the preferred embodiment of the present invention, it is nevertheless to be understood that minor changes may be made therein without departing from the spirit and scope of the invention as claimed.

What is claimed as new is:—

In a car brake, brake mechanism suspended beneath the floor of a car and including arms pivotally mounted beneath the floor between the car wheels, a cross-rod rectangular in cross section fixed in the lower ends of the arms and having a central cylindrical portion, a sleeve journaled on the cylindrical portion, brake shoes forwardly of the wheels fixed on the ends of the cross rod, means for holding the brake mechanism in an elevated inoperative position, said arms being of angle formation with the outer side of the angle bend curved inwardly to receive the axle supporting the wheels to limit movement of the shoes toward the wheels and mounting of the wheels on the brake shoes, said holding means including a hanger, a lever pivoted at its lower end to the hanger and extending upwardly through the car floor, a rigid link connection pivoted between the lever and sleeve, and a swinging latch plate flatly engaging the upper surface of the car floor and adapted to engage the lever.

In testimony whereof I affix my signature.

GEORGE F. CRASS.